United States Patent
Challener et al.

(10) Patent No.: US 7,523,319 B2
(45) Date of Patent: Apr. 21, 2009

(54) SYSTEM AND METHOD FOR TRACKING CHANGED LBAS ON DISK DRIVE

(75) Inventors: David Carroll Challener, Raliegh, NC (US); Rod David Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 238 days.

(21) Appl. No.: 11/282,055

(22) Filed: Nov. 16, 2005

(65) Prior Publication Data

US 2007/0113045 A1 May 17, 2007

(51) Int. Cl.
G06F 12/00 (2006.01)

(52) U.S. Cl. .................. 713/188; 713/187; 713/189; 713/190; 714/38; 711/216; 711/113; 711/118; 711/135; 711/133

(58) Field of Classification Search .............. 711/216, 711/118, 133, 135, 136, 113; 345/557; 726/24; 713/188, 187, 189, 190; 714/38
See application file for complete search history.

(56) References Cited

U.S. PATENT DOCUMENTS

| | | | |
|---|---|---|---|
| 4,637,024 A * | 1/1987 | Dixon et al. ............... 714/819 |
| 5,502,815 A * | 3/1996 | Cozza ...................... 714/38 |
| 5,649,095 A * | 7/1997 | Cozza ...................... 714/39 |
| 5,883,640 A * | 3/1999 | Hsieh et al. ................ 345/503 |
| 6,021,510 A * | 2/2000 | Nachenberg ............... 714/38 |
| 6,088,803 A * | 7/2000 | Tso et al. .................. 726/22 |
| 6,763,466 B1 * | 7/2004 | Glover ..................... 726/24 |
| 6,928,521 B1 * | 8/2005 | Burton et al. .............. 711/144 |
| 7,051,156 B2 * | 5/2006 | Shang ...................... 711/114 |
| 7,117,309 B2 * | 10/2006 | Bearden .................... 711/137 |
| 2003/0005116 A1 * | 1/2003 | Chase et al. ............... 709/225 |
| 2004/0010732 A1 * | 1/2004 | Oka ......................... 714/13 |
| 2005/0120263 A1 * | 6/2005 | Kano et al. ................. 714/6 |
| 2005/0262160 A1 * | 11/2005 | Grebenev ................... 707/201 |
| 2006/0179381 A1 * | 8/2006 | Durica et al. .............. 714/736 |
| 2006/0236074 A1 * | 10/2006 | Williamson et al. ........ 711/216 |
| 2007/0168615 A1 * | 7/2007 | Van Eijndhoven et al. .. 711/118 |

* cited by examiner

Primary Examiner—Hong Kim
(74) Attorney, Agent, or Firm—John L. Rogitz

(57) ABSTRACT

When data changes in LBAs of a disk storage, the IDs of changed LBAs are written to a cache, with the LBAs being hashed to render a hash result. The hash result and contents of the cache are written to a file on the disk, the cache flushed, and the hash result written back to the cache for hashing together with subsequent changed LBAs. The process repeats. In this way, the hash result in the most current file on the disk can be compared with the hash result in cache, and if the two match, it indicates that the files on the disk contain an accurate record of changed LBAs.

7 Claims, 2 Drawing Sheets

SYSTEM AND METHOD FOR TRACKING CHANGED LBAS ON DISK DRIVE

FIELD OF THE INVENTION

The present invention relates generally to systems and methods for tracking changes to logical block addresses (LBA) on disk drives such as hard disk drives and optical drives.

BACKGROUND OF THE INVENTION

Logical block addresses (LBAs) are logical locations of data on disk drives. Storing data in accordance with LBA principles is known in the art. Essentially, a LBA describes the location of data, so that the data may be retrieved by looking up its LBA and accessing the location. New data may be overwritten onto old data within an LBA, in which case the LBA may be considered "changed", in that the data with which the address is associated has changed.

The present invention understands that it is important for certain applications to know when an LBA has changed. For example, knowing which LBAs have not changed since a previous virus check, for instance, can promote more efficient future virus checks by skipping over LBAs that remain unchanged from earlier scans. Or, unchanged LBAs need be checked only for viruses that have been discovered since the last scan. That is, if it is known when an LBA has changed, it is unnecessary to check it against the virus table it was checked against last time, but only against "new" portions of the virus table. Furthermore, if it is known when a LBA was last changed, and if it is also definitively known that a new virus was developed after the change to the LBA, it can be inferred that the new virus cannot have infected the data in the LBA.

As further understood herein, however, a LBA change recordation system ideally is rendered essentially immune from a virus that might be specifically designed to evade it.

SUMMARY OF THE INVENTION

A computer system stores data on a disk using logical block addresses. The system includes a cache, with changed LBAs being written to the cache. A processor periodically hashes select contents of the cache to render a hash result. The processor writes the hash result and contents of the cache to a file on the disk, and then flushes the cache and writes the hash result back to the cache for hashing together with subsequent changed LBAs.

In some implementations the select contents include changed LBAs and a previous hash result. The changed LBAs are changed by virtue of having data therein changed since a benchmark time. The hash result in the most recent file containing changed LBAs may be compared to the hash result in cache to determine whether the files contain an accurate list of changed LBAs since the benchmark time. If desired, the files can be written to a portion of the disk that is not used for any other data writes.

In another aspect, a method for ascertaining which LBAs on a disk contain changed data since a benchmark time includes comparing a hash result on the disk with a hash result in cache, and if the two match, determining that files on the disk containing changed LBAs accurately reflect LBAs that have been changed since the benchmark time. Otherwise it is determined that the files do not accurately reflect LBAs that have been changed since the benchmark time.

In still another aspect, a data storage system includes disk means for storing data, solid state means for storing LBAs, and means for writing LBAs of changed data to the solid state means. Means are provided for combining the LBAs to render a hash result and for writing the LBAs and hash result to the disk means. Also, means are provided for flushing the solid state means and writing the hash result to the solid state means. Means write, subsequent to flushing the solid state means, LBAs of changed data to the solid state means, and then means combine the LBAs in the solid state means with the hash result to render a new hash result. Means are provided for writing the LBAs and new hash result to the disk means, with means flushing the solid state means and writing the new hash result to the solid state means. Means are provided for comparing the new hash result on the disk means with the new hash result in the solid state means.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
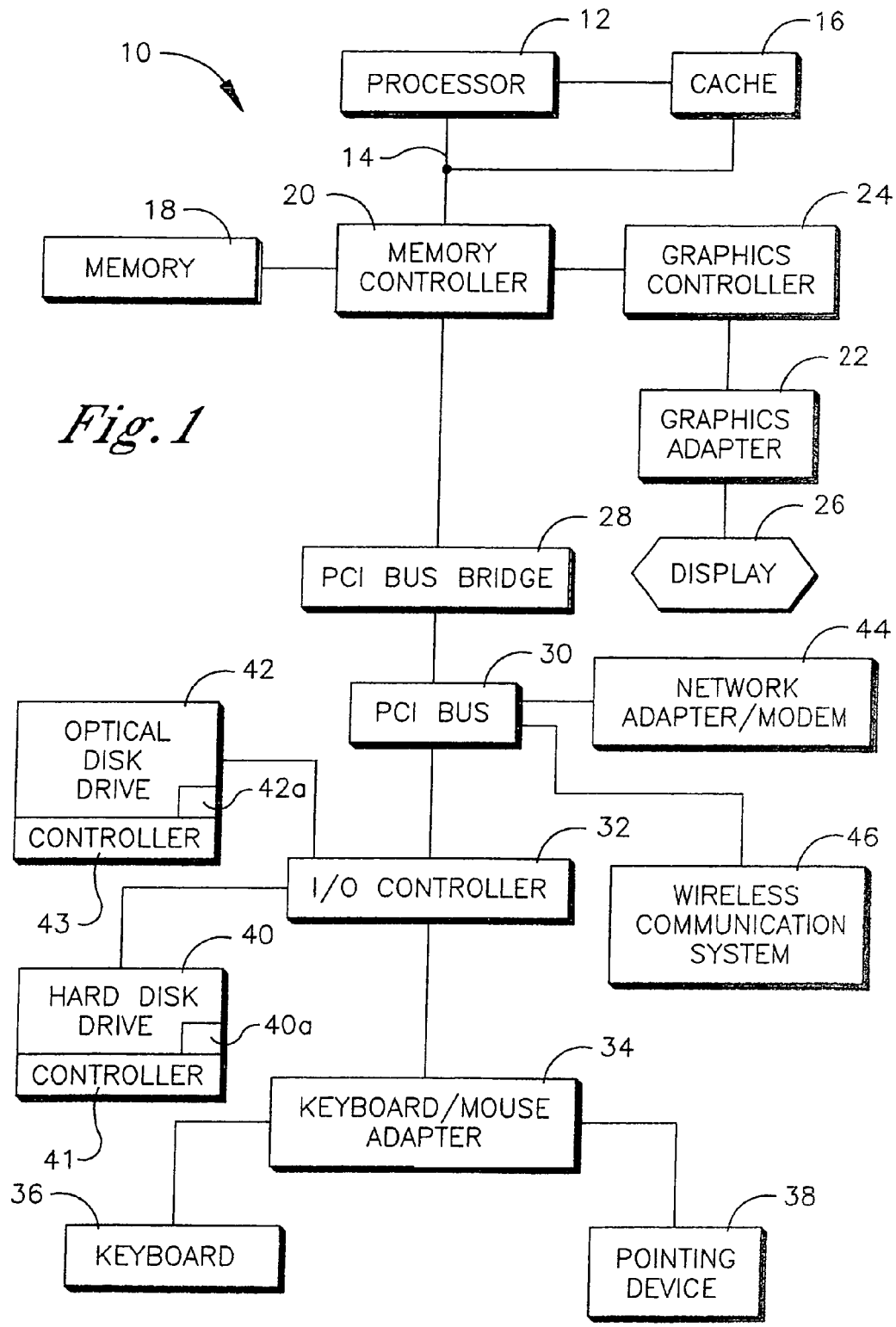
FIG. 1 is a block diagram of a non-limiting computer.

Referring initially to FIG. 1, a high-level block diagram of a data processing system, generally designated 10, is shown in which the present invention may be implemented. The system 10 in one non-limiting embodiment is a portable personal computer or laptop computer. The system 10 includes a processor 12, which may be, without limitation, a PowerPC processor available from Lenovo Corp. (or other processors made by, e.g., Intel or AMD and common to the industry). The processor 12 is connected to a processor bus 14, and a cache 16, which is used to stage data to and from the processor 12 at reduced access latency, is also connected to the processor bus 14. In non-limiting embodiments the processor 12 can access data from the cache 16 or from a system solid state memory 18 by way of a memory controller function 20. Also, the memory controller 20 is connected to a memory-mapped graphics adapter 22 by way of a graphic bus controller 24, and the graphics adapter 22 provides a connection for a monitor 26 on which the user interface of software executed within data processing system 10 is displayed.

The non-limiting memory controller 20 may also be connected to a personal computer interface (PCI) bus bridge 28, which provides an interface to a PCI bus 30. Connected to the PCI bus 30 may be an input/output (I/O) controller 32 for controlling various I/O devices, including, e.g., a keyboard/mouse adapter 34 which provides connection to a keyboard 36 and to a pointing device 38, which may be implemented by a mouse, trackball, or the like. Additionally, a hard disk drive 40 is connected to the I/O controller 32. The HDD 40 includes a drive controller 41 and if desired onboard RAM or other solid state memory 40a. If desired, an optical disk drive 42, such as a DVD or CD drive, can be connected to the I/O controller 32, with the optical disk drive 42 including a drive controller 43 and if desired onboard RAM or other solid state memory 42a. In some implementations a network adapter 44 can be attached to the PCI bus 30 as shown for connecting the data processing system 10 to a local area network (LAN), the Internet, or both. Also, a wireless communication system 46 can be connected to the PCI bus 30 as shown to communicate wirelessly using, e.g., Bluetooth or Wi-Fi with nearby wireless communication stations. In any case, in accordance with principles known in the art, during power-on the processor 12 executes a basic input/output system (BIOS) program that may be stored in the memory 18, to load an operating system in the hard disk drive 40 into the memory 18.

Figure 2:
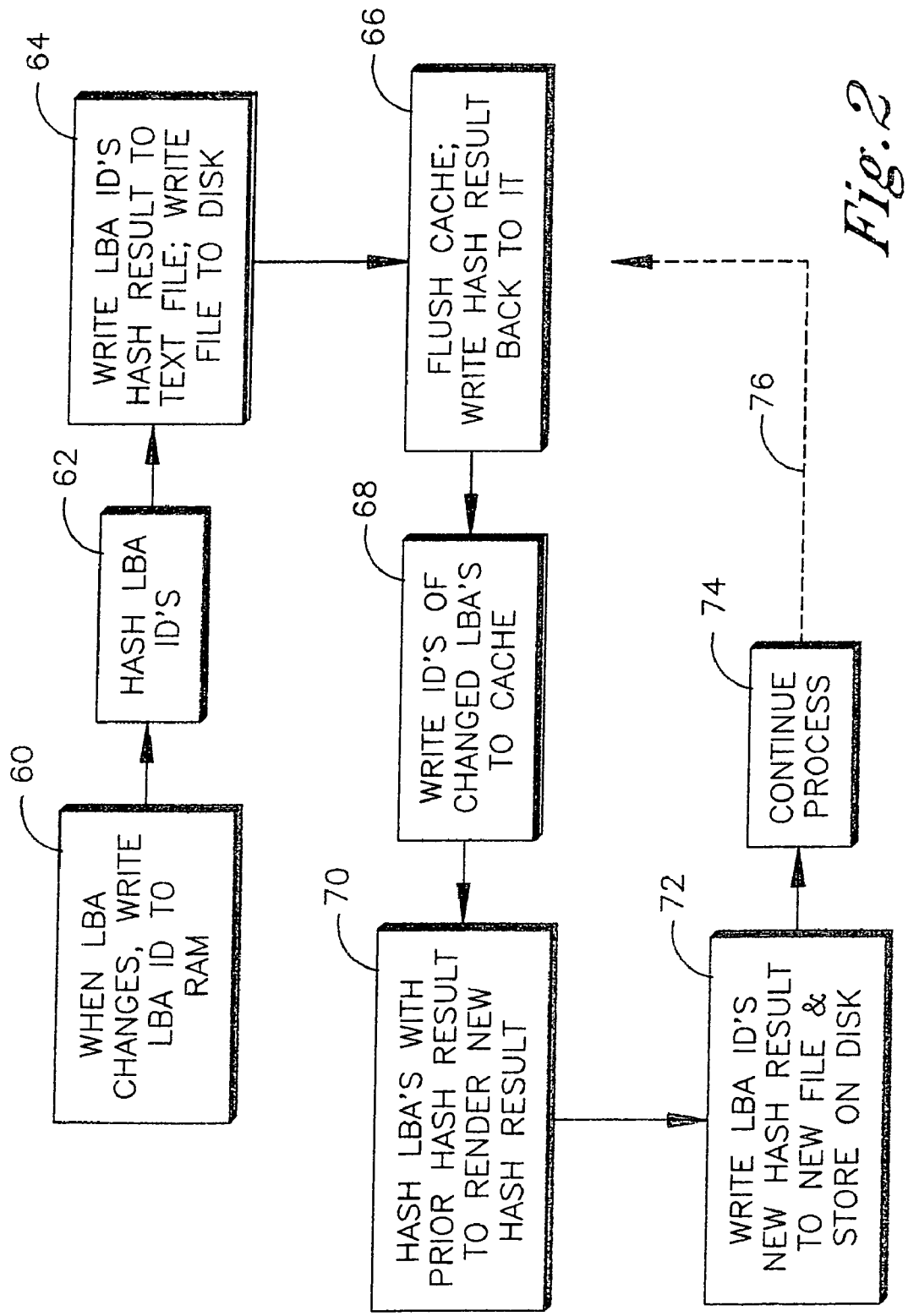
FIG. 2 is a flow chart of a non-limiting embodiment of the present logic.

Now referring to FIG. 2, the present logic may be seen. It is to be understood that the logic may be implemented by any one of the controllers or processors shown in FIG. 1, and may apply to any disk drive that uses LBAs.

Commencing at block 60, when data in a LBA is changed, the ID of the LBA is written to RAM cache (e.g., the computer cache 16 or the HDD cache 40a) which may be password-protected. Preferably, the ID of each changed LBA is written to the cache. In lieu of password protection, other means of protection may be used, e.g., a physical switch or button on the HDD must be pressed to write the data to the cache, or a digital signature challenge/response method can be used, or a keyed hash message authentication code (HMAC) may be used to protect the data. Or yet again, changed LBA IDs can be pinned in the flash memory on the HDD in lieu of storing them on the disk or indeed in addition to storing them on the disk.

Moving to block 62, when the RAM cache is full (or when requested), all the LBA IDs are hashed together using, e.g., secure hash algorithm one (SHA-1). Proceeding to block 64, the changed LBA IDs along with the results of the hash are written to a text file and then the result of the hash is written to a dedicated location on the HDD, e.g., a location that is not recorded in cache or otherwise that is not available for writing data to. The hash result may also be written if desired to RAM onboard the HDD and to the computer's flash memory 18.

At block 66, the RAM cache is flushed, and the hash result written to it. Moving to block 68, as additional LBAs experience data changes, their IDs are written to the RAM cache. Then, at block 70 when the RAM cache is full or when requested, the LBA IDs in RAM cache are hashed together along with the previous hash result to render a new hash result, with the changed LBAs and new hash result once again written to the HDD as a new text file at block 72. The RAM cache is then flushed, the new hash result written to it, and as indicated at block 74 and dashed logic loop 76 the above process repeats as necessary as LBAs are changed and the RAM cache is filled.

When it is desired to recover the IDs of the changed LBAs, the text files on the disk are accessed and the IDs retrieved. For security, the hash result that resides in RAM cache is compared with the hash result of the most recent text file on the disk, with a match indicating that the text files contain an accurate record of changed LBAs and with a mismatch indicating the opposite.

While the particular SYSTEM AND METHOD FOR TRACKING CHANGED LBAs ON DISK DRIVE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A computer system storing data on a disk using logical block addresses (LBAs), comprising:
   at least one cache, the system writing changed LBAs to the cache; and
   at least one processor periodically hashing select contents of the cache associated solely with changed LBAs to render a hash result and writing the hash result and contents of the cache to a file on the disk, the processor flushing the cache and writing the hash result back to the cache for hashing together with subsequent changed LBAs.

2. The system of claim 1, wherein the select contents include changed LBAs and a previous hash result.

3. The system of claim 2, wherein the changed LBAs are changed by virtue of having data therein changed since a benchmark time.

4. The system of claim 3, wherein a hash result in a most recent file containing changed LBAs is compared to the hash result in cache to determine whether the files contain an accurate list of changed LBAs since the benchmark time.

5. The system of claim 1, wherein the cache is RAM cache.

6. The system of claim 1, wherein the files are written to a portion of the disk that is not used for any other data writes.

7. A data storage system, comprising:
   disk means for storing data;
   solid state means for storing LBAs;
   means for writing LBAs of changed data to the solid state means;
   means for combining the LBAs to render a hash result;
   means for writing the LBAs and hash result to the disk means;
   means for flushing the solid state means and writing the hash result to the solid state means;
   means for writing, subsequent to flushing the solid state means, LBAs of changed data to the solid state means;
   means for combining the LBAs in the solid state means with the hash result to render a new hash result;
   means for writing the LBAs and new hash result to the disk means;
   means for flushing the solid state means and writing the new hash result to the solid state means; and
   means for comparing the new hash result on the disk means with the new hash result in the solid state means.

* * * * *